United States Patent Office 3,112,208
Patented Nov. 26, 1963

3,112,208
MANUFACTURE OF CARBON ARTICLES
Paul C. Johnson, Janesville, Wis., assignor to Union Carbide Corporation, a corporation of New York
No Drawing. Filed Nov. 29, 1960, Ser. No. 72,287
4 Claims. (Cl. 106—56)

This invention relates to improved methods for forming shaped carbon and graphite articles.

Shaped carbon articles are commonly manufactured by mixing some form of carbon such as powdered coke, graphite, lamp black and the like, or a mixture of these materials, with a suitable carbonizable, thermoplastic binder, such as tar or pitch. The resulting mix is shaped while it is still plastic in consistency. The shaped articles, then, are baked at a slowly increasing temperature to a temperature sufficient to carbonize the binder, and eventually graphitized, if desired, by heating to 2500° C. or 3000° C.

The process above described is suitable, mainly, for the production of shaped articles of rather large dimensions. In order to form small carbon articles of intricate shape, it is conventional practice to machine them from larger ones, an admittedly expensive practice. To avoid this expense, researchers have endeavored to apply casting techniques, used with plastic materials, to the carbon art.

Prior art attempts to produce carbon articles by casting pitch-bonded carbonaceous mixes have not been satisfactory. One reason for this lack of success is that so much thermoplastic pitch must be used to obtain a pourable consistency of the mix that the resulting articles have a low density of about 1.35 and readily crumple or distort.

In my co-pending application Serial No. 44,870, filed July 25, 1960, there is disclosed a carbonaceous cement consisting essentially of finely divided graphitizable carbanaceous particles and a completely carbonizable thermosetting binder consisting of a furfuraldehyde ketone condensation product of a hydrogenated mono- and difurfurylidene ketones having a coking value of about 48 percent by weight. I have now found that this cement may be used advantageously in the manufacture of small intricate carbon articles by casting, extruding and related methods.

The thermosetting organic binders to be used in the practice of the invention preferably should yield a completely graphitizable coke, and should have a coking value of about 48 percent. Stated another way, the selected resin must leave a "soft" coke residue after carbonization, which can be graphitized. This requirement eliminates most thermosetting resins from consideration, for these, on carbonizing, form "hard" carbon residues which resist graphitization.

A particularly suitable thermosetting resin binder for the invention is that marketed under the name "Furatone." This resin is impervious to strong oxidizing and reducing agents and is a furfuraldehyde-ketone condensation product composed of a mixture of partially hydrogenated mono- and di-furfurylidene ketones. These ketones have the general formula:

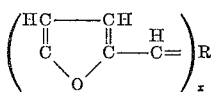

wherein $x$ is a number selected from the group of 1 and 2, and R is a ketone lacking two of the hydrogen atoms normally on either one or both of its alpha atoms. The ketones may be acetone, mesityl oxide, diacetone alcohol, methyl ethyl ketone, or acetonyl acetone. The compounds result from the reaction between the furfuraldehyde and the ketone wherein two hydrogens on the alpha carbons unite with the oxygen of the furfuraldehyde to split off water. The compounds are partially hydrogenated to between 15 to 65% of the quantity of hydrogen needed to completely saturate their double bonds in and out of the furane ring. The resulting resins are described and claimed in U.S. Patent No. 2,600,764, issued June 17, 1952.

In forming carbon articles in accord with the present process, it is possible to use wider latitudes in the cement composition used than when the same is intended as a cementing agent for carbon or graphite joints. Thus, it is possible to use mixes using carbon and/or graphite particles of various particle sizes, although since the manufacture of small articles is generally intended, the particle size of the constituents should also be small.

In the practice of the invention, finely divided carbonaceous particles are mixed with about 15 to about 50 percent of the binder, together with about 2 to about 5 percent of a polymerization catalyst for the same, such as p-toluene sulfonic acid, phosphoric acid, hydrochloric acid, sulfuric acid or benzene sulfonyl chloride. The thus-formed mix has hydraulic properties and can be formed by casting or by injection molding into a mold. It is then cured at about 125° C., and then baked in 100° C. increments to about 700° C. If desired, the baked article then can be graphitized by conventional methods.

A preferred range of constituents to be used in the process of the invention is about 25 to about 35 percent by weight of the organic binder with about 2.5 to about 3.5 percent by weight of the catalyst, the balance being a carbonaceous filler.

The filler material employed in the invention includes graphite and completely graphitizable materials. The means diameter of the filler particles preferably should be below 0.002 inch. Generally suitable is a filler composed of from 25 and 50 parts by weight of carbon black having a mean diameter of 5 to 10 millimicrons with 50 to 75 parts by weight of graphite flour. Where volume change and low electrical resistance are not critical, the filler can consist exclusively of 90 percent through 200 mesh milled coke.

In an example of the practice of the invention, blocks were cast from a formulation consisting of:

Dry blend (filler)—                  Percent by weight
    55 percent through 200 mesh graphite flour___ 37.5
    Carbon black_____ 37.5

Binder—
    "Furatone" resin_____ 25.0

Catalyst—                           P.p.h. of cement
    Neutral diethyl sulfate_____ 2.5

Table I below lists the physical properties of a block made from the above formulation, after the block was cured and carbonized at 700° C.

TABLE I

|  | Temp. Heated, °C. | Wt. (gms) | Vol. (cm.³) | A. D. (gms./cm.³) | Sp. Res. ×10⁻⁴ (ohm-cm.) |
|---|---|---|---|---|---|
| Cured_____ | 125 | 10.504 | 6.235 | 1.685 | 772.6 |
|  | 200 | 10.4702 | 6.173 | 1.696 | 701.2 |
|  | 300 | 10.2125 | 6.045 | 1.689 | 405.0 |
|  | 400 | 9.8172 | 6.091 | 1.612 | 434.9 |
|  | 500 | 9.4642 | 6.215 | 1.523 | 579.5 |
|  | 600 | 9.3063 | 6.134 | 1.517 | 350.6 |
| Carbonized____ | 700 | 9.1300 | 6.043 | 1.511 | 63.34 |
| Percent Change_____ |  | (−)13.87 | (−)3.08 | (−)10.3 | (−)91.8 |

(−) sign indicates a decrease in magnitude.

These properties were measured by placing the formed sample article in a ceramic sagger packed with sand and coke. The sample was withdrawn at each temperature, cooled, measurements were taken, and the sample was replaced in the sagger.

The high density and low resistance of the formed article are noteworthy. It should also be noted that unlike thermoplastic-bonded mixes, the amount of shrinkage occurring with the articles formed in accordance with the present process is very low.

Extrudible mix compositions employing "Furatone" as the binder were prepared from the following formulations:

(1) 70 g. coke flour
30 g. carbon black
29.3 g. "Furatone"—Benzene Sulfone Chloride (BSC) mixture obtained by mixing 50 g. of "Furatone" with 5 g. of BSC (29.3 g. of this mixture was used as the catalyzed Furatone binder media.)
2 g. Furfuryl alcohol (added to make the mix wetter and easier to extrude)

(2) 70 g. coke flour
carbon black
25 g. "Furatone"—Benzene Sulfone Chloride (BSC) mixture obtained by mixing 40 g. of "Furatone" with 4 g. of BSC (25 g. of this mixture was used as the catalyzed Furatone binder media.)
2 g. Furfuryl alcohol Rods were extruded from mixes having the above-indicated formulations, using conventional carbon-extruding equipment. The rods were then placed in a graphitizing furnace and graphitized. Their physical properties were determined and are listed below.

*Physical Properties of "Furatone" Bonded Rods After Graphitization*

| Mix | Wt. (g.) | Length (in.) | Dia. (in.) | Vol. (cc.) | Apparent density (g./cc.) |
|---|---|---|---|---|---|
| (1) | 21.70 | 4.2 | .486 | 12.7 | 1.71 |
| (2) | 23.51 | 4.5 | .484 | 13.5 | 1.74 |

The present process is particularly attractive for the production of very intricate shaped carbon articles having sharp angles and curves by casting or injection molding. It also lends itself to the manufacture of completely graphitic articles since the binder can be graphitized. Another advantageous feature of the present process is that it makes possible rapid fabrication of plugs used to fill up cracks in mortar and plaster cracks in blast furnace walls and of the conventional "tap hole" plugs.

While the foregoing specification has stressed the application of the instant process to the fabrication of small, intricately shaped articles, it should be understood that the same is equally applicable to the manufacture of electrodes and other large carbon products.

This application is a continuation-in-part of U.S. application, Serial No. 702,253, filed December 12, 1957, and now abandoned.

What is claimed is:

1. The process of making shaped carbon articles which consists in mixing graphite flour and carbon black with about 25 to about 35 percent by weight of a thermosetting binder consisting of a furfuraldehyde-ketone condensation product of hydrogenated mono- and di-furfurylidene ketone and from about 2.5 to about 3.5 percent of diethyl sulfate, forming the resulting mixture to desired shape, and heating the shape to about 700° C.

2. The process of making small, intricately shaped carbon articles, comprising intimately mixing finely divided graphitizable carbonaceous particles with a thermosetting binder which is a mixture of mono- and di-furfurylidene ketones having the formula:

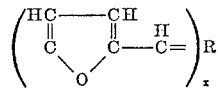

wherein $x$ is a number ranging from 1 to 2, R is a radical derived from a ketone by the removal of two hydrogen atoms from at least one of its alpha carbon atoms, said ketone being selected from the group consisting of acetone, mesityl oxide, diacetone alcohol, methyl ethyl ketone, and acetonyl acetone, said binder being hydrogenated to between 15 and 65 percent of the quantity needed to completely saturate the double bonds in and out of the furan ring, forming the resulting mixture into a desired shape, and heating said shape to carbonize said binder therein.

3. The process of claim 2, additionally characterized by the incorporation in said mix of about 10 percent by weight of the binder of a catalyst selected from the group consisting of p-toluene sulfonic acid, phosphoric acid, hydrochloric acid, sulfuric acid and benzene sulfonyl chloride.

4. The process of claim 2, wherein the amount of binder used ranges from about 15 to about 50 percent by weight.

References Cited in the file of this patent

UNITED STATES PATENTS 2,507,390    Wallace _____ May 9, 1950
2,600,764    Harvey _____ June 17, 1952